Dec. 4, 1962   J. C. DUDDY   3,067,273
METHOD OF TREATING STORAGE BATTERY ELECTRODES
Filed Dec. 4, 1959

INVENTOR.
JOSEPH C. DUDDY
BY
ATTORNEY

3,067,273
METHOD OF TREATING STORAGE BATTERY ELECTRODES
Joseph C. Duddy, Trevose, Pa., assignor to The Electric Storage Battery Company, a corporation of New Jersey
Filed Dec. 4, 1959, Ser. No. 857,405
8 Claims. (Cl. 136—27)

The present invention generally relates to electric storage batteries of the lead-acid type. More specifically, the present invention is concerned with a new and improved method of setting or curing the electrodes of a lead-acid type battery.

In the manufacture of lead-acid type storage battery plates of the pasted or Faure type, it is customary to apply a paste comprising certain lead oxides and sulfuric acid to a conductive support or grid. The plate thus produced is subjected to a drying operation whereby the active material is set or hardened. The time required for this operation varies with the temperature and humidity of the enviroment in which the process is carried out, but in general, the setting process requires about 2 to 4 days. In addition to the loss of time involved many variables attend the conventional setting process and these variables are reflected in the non-uniform handleability and performance of the finished plates.

Conventional methods of setting pasted electrodes usually results in the formation of cracks in the body of the active material due to shrinkage. This cracking causes non-uniform porosity, non-uniform electrical contact with the grid, and uneven surface contours which are conductive to the entrapment of gas between the plate surfaces and the separator. This situation results in an overall lack of product uniformity and in batteries having lower volumetric efficiencies. Furthermore, in the case of positive electrodes, the effect of oxygen, moisture and elevated setting temperatures results in the hydration or corroding of the lead constituent of the electrode grid which frees any antimony in the grid alloy, which during battery operation will subsequently be deposited on the negative electrode causing self-discharge or local action.

It is an object of the present invention to provide a new and improved method for rapidly setting or curing pasted type battery electrodes.

It is another object of the present invention to provide a method for setting battery electrodes that will provide electrodes having flat, uniform surfaces and uniform thicknesses.

It is still another object of the present invention to provide a method for rapidly setting pasted type battery electrodes which will provide electrodes having controlled and uniform porosity and uniform contact of the active material with the grid members.

It is a further object of the present invention to provide a method of setting battery electrodes which eliminates the corrosion or hydration of the grid metal which is normally associated with the conventional conditioning process.

In accordance with the present invention there is provided a high temperature-pressure setting process wherein the electrode grid framework furnishes, under the influence of externally applied mechanical pressure, a seal to confine the water vapor present in a freshly pasted electrode to form super heated steam which almost instantaneously hydrates and sets the paste without an adverse physical disruption of the paste structure. The process involves the pressing of either a single freshly pasted electrode or a plurality of uniformly stacked freshly pasted electrodes between heated platens for a relatively short period of time followed by a gradual release of pressure to permit the escape of the steam generated.

A better understanding of the present invention may be had from the following description when read with reference to the accompanying drawings of which:

Figure 1:
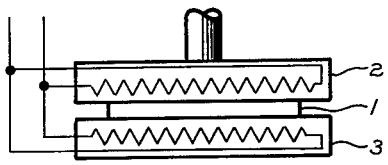
FIG. 1 is a diagrammatic representation of the process the present invention wherein a single electrode is treated.

In accordance with one method of carrying out the present invention, freshly pasted electrodes are pressed between hot platens at temperatures between about 225° F. and about 350° F. at pressures of from 80 pounds per square inch to about 400 pounds per square inch. As shown in FIG. 1, this operation may be carried out by pressing a freshly pasted electrode 1 between a pair of electrically heated platens 2 and 3. The electrodes to be treated are preferably flush pasted or slightly under pasted so that the pressure of the platens is exerted on the perimeter of the grid to form a seal. The rapid application of pressure compresses the natural frame of the grid before the electrode itself reaches a temperature in excess of the boiling point of the water. With the temperature of the platens above the boiling point of water and if the pressure is applied rapidly, the setting process goes to completion almost immediately. The moisture in the paste within the seal immediately creates steam due to the elevated temperatures of the heated faces of the platens. The saturated atmosphere resulting from the high temperatures and pressure rapidly conditions the active material in the paste.

While the treating time depends on the geometry and thermal capacity of an electrode, the treating temperature, and also on the results desired, treating times of from ¼ to five minutes have been found satisfactory for treatments carried out within the pressure and temperature ranges stated above. The release of pressure on the treated electrode should be gradual permitting the steam generated to escape slowly. A pressure release time of about ½ minute has been found to be satisfactory for the time, temperature and pressures specified. The functioning of this process to produce optimum structurization of the conditioned active material appears to be associated with the simultaneous application of pressure or physical restraint of the active material in the confines of the grid during the release of steam generated.

As stated hereinbefore electrodes which are to be treated in accordance with the present invention are preferably flush pasted or slightly underpasted. Moderate overpasting can be tolerated if accomplished uniformly over the entire surface of an electrode or as restricted to the grill section of a grid leaving the frame clean. It has been found, however, that overpasting tends to make the process more critical since all of the mechanical operations required by the process must be more exact. In this respect, it has also been found that lower density pastes give a greater tolerance to overpasting than pastes of higher densities.

In order to prevent treated electrodes from sticking to the heated faces of the platens and to assist in the sealing operation, it has been found advantageous to provide a resilient facing for the platens. For this purpose, thermoplastic resin such as tetrafluoroethylene, trifluorchlorethylene or nylon which are not degraded at the temperatures at which the process is carried out have been found applicable. Another method of preventing the sticking of electrodes to the faces of platens is to knurl the faces of the platens where the pasted section of an electrode is contacted. Still another method of preventing the sticking of pasted electrodes to the platens is to cover the faces of the electrodes with sheets of cellophane or other similar material which can be peeled from the electrode after treatment.

Figure 2:
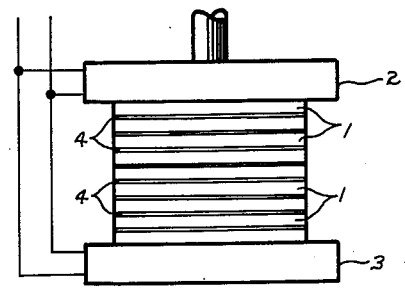
FIG. 2 is a diagrammatic representation of the process in accordance with the present invention in which a plurality of stacked electrodes are simultaneously treated.

While the process of the present invention has been described hereinbefore in connection with the treating of a single electrode, it should be understood that the method of the present invention is applicable to the simultaneous treatment of a plurality of electrodes. Referring now to FIG. 2, the simultaneous treatment of a plurality of stacked electrodes may be carried out by pressing a stack of freshly pasted electrodes 1 between a pair of heated platens 2 and 3. The electrodes to be treated are separated from one another by sheet material such as cellophane which is adapted to prevent the electrodes from sticking to each other. Electrodes which are to be treated simultaneously must have uniform grid contours and be stacked in such a manner that their grids coincide with each other in order to effect identical pressure on all the electrodes treated and provide effective seals at the grid frames. The time and temperature of treatment has been found to increase directly as the number of electrodes treated simultaneously is increased. For example, electrodes of a type which require a treatment time of from one-half to two minutes at 275° F. when treated singly have been found to require a treatment time of from three to five minutes at a temperature of 325° F. treated in stacks of ten. In this respect, however, the ranges of time and temperature specified hereinbefore have been found applicable for electrodes treated in multiple groups.

Electrodes treated in accordance with the present invention, may be assembled as delivered from the press. Such plates will, however, contain from three to five percent moisture but will air dry rapidly if racked while hot. Conventional method of forced drying may be used if desired. Treated electrodes may be tank formed and jar formed in the usual manner following treatment.

Figure 3:
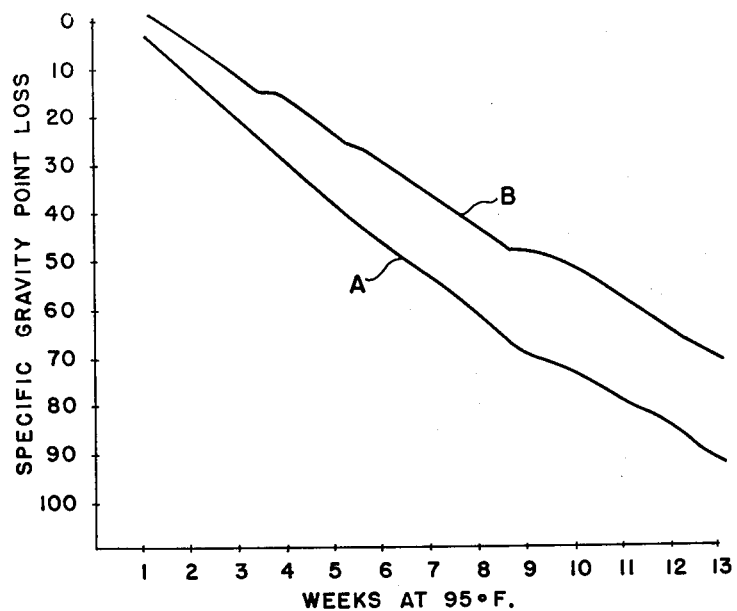
FIG. 3 is a graph showing the result of a comparative stand-life test of a regular production battery and a battery processed in accordance with the present invention.

Electrodes treated in accordance with the present invention have been found to be characterized by improved handleability, uniform porosity, uniform internal resistance, and uniform surface characteristics. One of the primary advantages of electrodes treated in accordance with the present invention, however, is a reduction in local action of batteries utilizing such electrodes. The effect of local action in a lead-acid battery may be determined by measuring the drop in the specific gravity of the electrode during an open circuit stand which is a measure of the loss of battery capacity. In order to demonstrate the reduction in local action provided by electrodes treated in accordance with the present invention the following test was made. Two batteries indentical in every respect except that the electrodes of one were treated in accordance with the method of the present invention were subjected to a thirteen week open circuit stand at 95° F. The batteries tested were of the automotive type having electrodes approximately 4½" wide, 5" long and 0.07" thick. The treated electrodes were processed at 275° F. for two minutes under a pressure of 140 pounds per square inch. The results of this test are illustrated in the curves of FIG. 3. The battery identified as A was the standard production battery while the battery identified as B was a battery treated in accordance with the present invention. As is evident from an inspection of the curves of FIG. 3 the stand loss characteristics of the battery $b$ are 22% better than those of battery A, the regular production battery. In considering the reduction of stand loss and other advantages achieved by virtue of the present invention, however, the saving in processing time afforded by its use should not be overlooked.

Having described the present invention that which is claimed as new is:

1. A process for setting pasted type lead-acid battery electrodes comprising the pressing of said electrodes between platens heated to a temperature of from about 225° F. to about 350° F., at a pressure of from about 80 pounds per square inch to about 400 pounds per square inch for a period of from about fifteen seconds to about five minutes.

2. A process for setting pasted type electrodes for lead-acid type batteries which comprises the steps of rapidly applying pressure of from about 80 pounds per square inch to about 400 pounds per square inch to said electrodes with platens heated to a temperature of from about 225° F. to about 350° F., maintaining said pressure for a period of from about fifteen seconds to about five minutes, then slowly releasing said pressure to permit the gradual release of steam generated within said pasted electrode while maintaining a restricting pressure on said electrodes.

3. A process for treating electrodes for lead-acid batteries of the pasted lead grid type which comprises the steps of rapidly applying pressure of from about 80 pounds per square inch to about 400 pounds per square inch to said electrodes with platens heated to a temperature of from about 225° F. to about 350° F., the faces of said platens forming a seal with said electrode grids which confines the steam generated within the paste to said grids, maintaining said pressure for a period of from about fifteen seconds to about five minutes, then slowly releasing said pressure to permit the gradual release of steam therefrom.

4. The process specified in claim 3 wherein said pressure is released gradually over a period of approximately one-half minute.

5. A process for making battery electrodes for lead-acid type batteries which comprises the steps of flush pasting a metallic grid, rapidly applying a pressure of from about 80 pounds per square inch to about 400 pounds per square inch to said grid with platens heated to a temperature of from about 225° F. to about 350° F. in such a manner as to form a seal between said grid and the faces of said platens which confines the steam generated within said paste to said grid, maintaining said pressure for a period of from about fifteen seconds to about five minutes, then slowly releasing said pressure over a period of about one-half minute to release the steam generated from said electrode.

6. A process for simultaneously treating a plurality of similar pasted type electrodes for lead-acid batteries which comprises the steps of stacking said pasted electrodes in a manner such that their grid frameworks coincide, said stacked electrodes being separated from each other by sheet material adapted to prevent the adherence of said electrodes to each other, rapidly applying pressure to said stacked electrodes with platens heated to a temperature of from about 225° F. to about 350° F. in such a manner that the electrode grids form seals with one another and with the faces of said platen which confines the steam generated in the pasted electrodes to within said grids maintaining said pressure for a period of from about fifteen seconds to about five minutes, then slowly releasing said pressure to permit the gradual and slow release of steam generated.

7. A process for setting pasted type lead-acid battery electrodes comprising the steps of pressing said electrodes between platens heated to a temperature of from about 225° F. to 350° F., at a pressure of from about 80 pounds per square inch to about 400 pounds per square inch for a period of at least fifteen seconds and gradually releasing the pressure on said electrodes to permit the non-violent release of steam therefrom.

8. The process specified in claim 7 wherein said pressure is released gradually over a period of approximately one-half minute.

References Cited in the file of this patent

UNITED STATES PATENTS

| | | |
|---|---|---|
| 1,524,567 | Plews | Jan. 27, 1925 |
| 1,670,047 | Plews | May 15, 1928 |
| 2,724,734 | Howard | Nov. 22, 1955 |